United States Patent [19]

Noble

[11] Patent Number: 4,485,376

[45] Date of Patent: Nov. 27, 1984

[54] STACKED LIQUID CRYSTAL DISPLAY

[75] Inventor: Robert T. Noble, Dallas, Tex.

[73] Assignee: Texas Instruments Incorporated, Dallas, Tex.

[21] Appl. No.: 457,846

[22] Filed: Jan. 14, 1983

Related U.S. Application Data

[63] Continuation of Ser. No. 198,073, Oct. 17, 1980, abandoned.

[51] Int. Cl.³ .............................................. G09G 3/36
[52] U.S. Cl. ....................................... 340/716; 340/718; 340/784; 340/815.2; 350/335
[58] Field of Search .............. 340/718, 719, 716, 756, 340/765, 784, 815.2; 350/330, 334, 335

[56] References Cited

U.S. PATENT DOCUMENTS 3,295,228 1/1967 Turnbull ............................ 340/716
3,982,239 9/1976 Sherr ................................. 350/333
4,078,257 3/1978 Bagley .............................. 340/712
4,231,640 11/1980 Funada et al. .................... 340/784
4,260,224 4/1981 Takayama ......................... 350/335
4,320,484 3/1982 Burdet .............................. 340/754

FOREIGN PATENT DOCUMENTS 53-5594 1/1978 Japan ................................. 340/716

Primary Examiner—Marshall M. Curtis
Attorney, Agent, or Firm—Robert D. Marshall, Jr.; N. Rhys Merrett; Melvin Sharp

[57] ABSTRACT

Two levels of liquid crystal material and upper, center and lower transparent members are sandwiched to form a stacked display. Segment electrodes, which are disposed on opposite sides of the center transparent member, are controllable to selectively display information in one of the two levels while the other level is caused to remain transparent.

3 Claims, 11 Drawing Figures

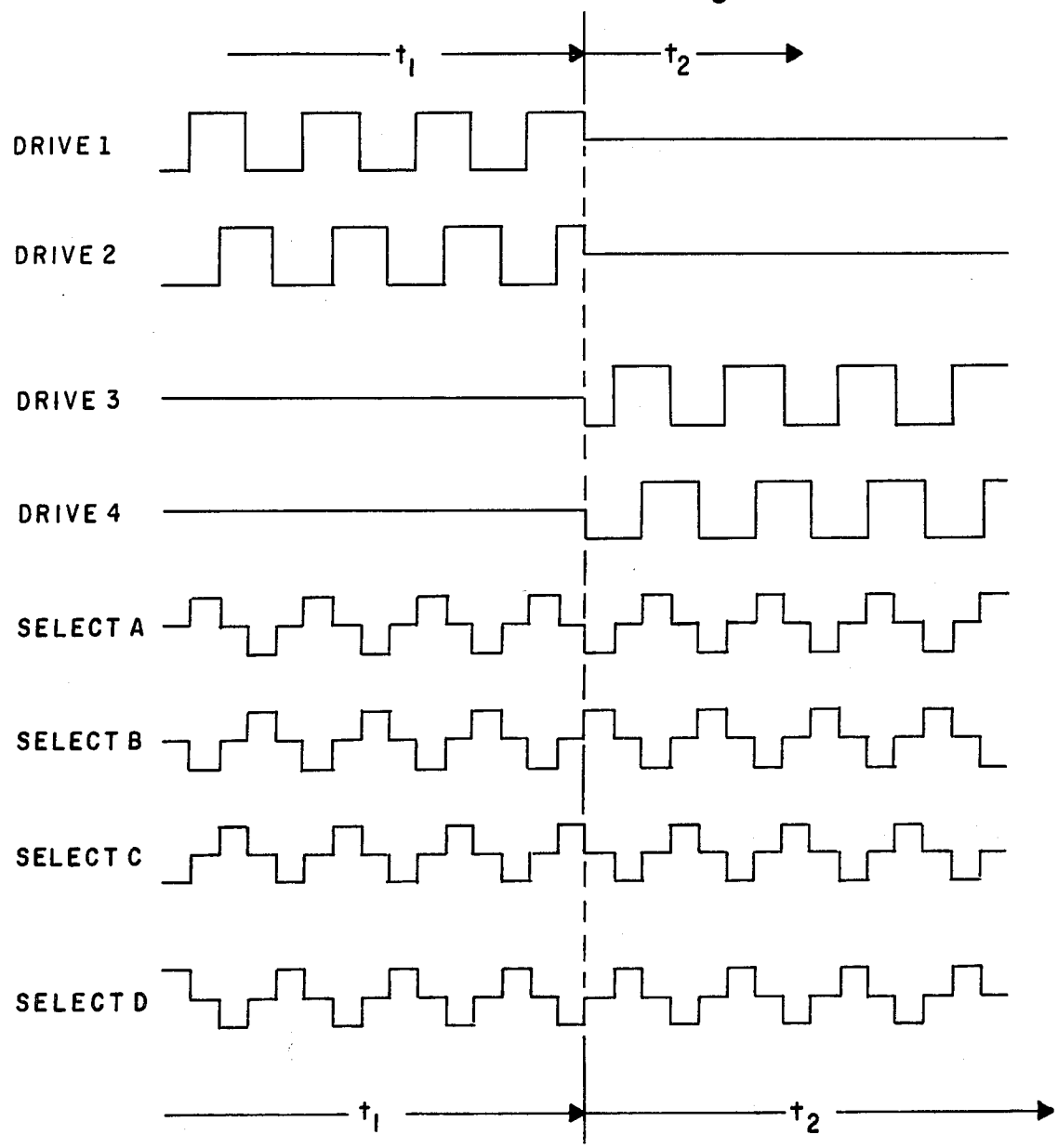

STACKED LIQUID CRYSTAL DISPLAY

This is a continuation of application Ser. No. 198,073, filed Oct. 17, 1980, now abandoned.

BACKGROUND OF THE INVENTION

This invention relates to liquid crystal displays and more particularly to such displays having multiple levels.

With the widespread use of silicon chips to digitally control the displays of watches, games, hand-held calculators, and similar devices came the ability to communicate to the operator more information than he normally or routinely demanded. This data or information is generally stored in memory or a register and is not displayed until it is needed by the operator.

Since such devices typically are hand-held, there exists a limited work space or display area available to communicate information. To accomodate such restrictions, same display window is often used to communicate both commonly used data, and, upon selection by the operator, specialized or non-routine data. One way to achieve multiple uses of the same display space is by means of a stacked display, which enables the same display window or area to communicate different types of data.

The stacked display basically consists of two or more levels of electro-optic cells, such as liquid crystal segments. Such cells or segments are normally transparent but become opaque when electrically activated. By applying electrical stimulation to certain segments of a display, different information may be selectively communicated to the operator. A prior-art stacked display is described in U.S. Pat. No. 4,013,901 issued to Clark Williams on Mar. 23, 1977.

Due to the characteristics of liquid crystal displays, an alternating current must be used to maintain reliability while obtaining satisfactory contrast ratios. This requirement of alternating current has led to the development of multiplexing techniques such as the half duty cycle, third duty cycle, and others. Liquid crystal display segments are not responsive to instanteous impulses but are responsive to root mean squared (RMS) potentials. The various multiplexing schemes take advantage of the nonlinear optical response to the applied RMS potential, such that an "off" RMS potential effects a response less than an optical threshold and an "on" potential causes optical saturation of the liquid crystal material.

The presently preferred way of carrying out the invention wil now be described with reference to the accompanying drawings.

BRIEF DESCRIPTION OF THE DRAWINGS

FIG. 4a illustrates signals applied to the bus lines and drive lines according to the invention.

FIGS. 4b, 4c, 4d, and 4e illustrate the potential differences achievable by applying the various drive line signals and bus line signals illustrated in FIG. 4a.

FIG. 6 is a logic diagram of a circuit for generating the signals of FIG. 4a.

DESCRIPTION OF THE PREFERRED EMBODIMENT

Figure 1:
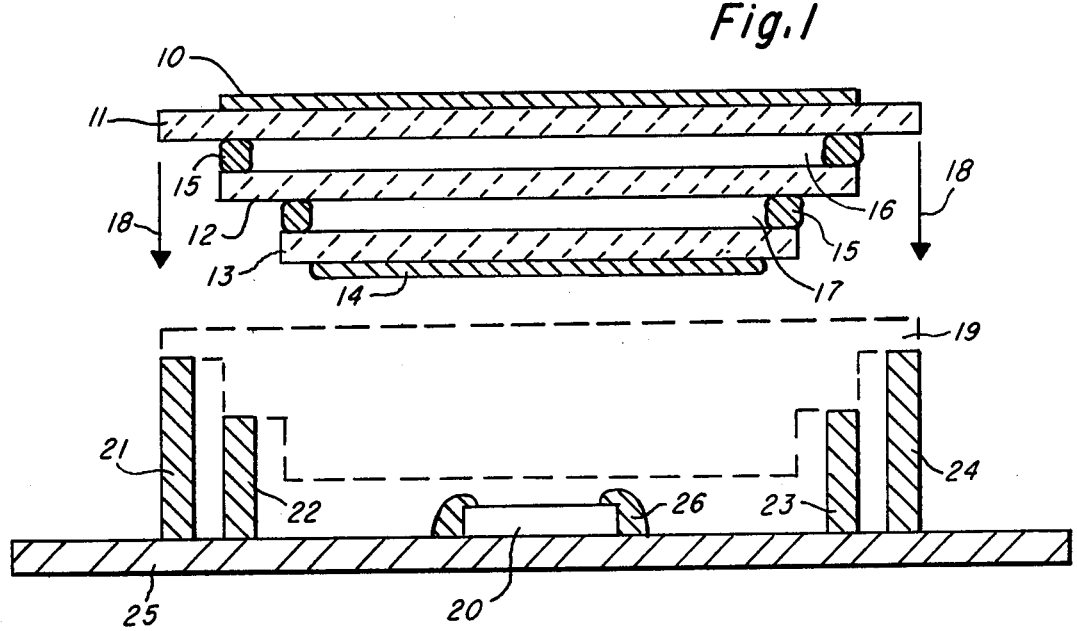
FIG. 1 is a schematic cross section of a preferred embodiment of the invention.

In accordance with the invention, FIG. 1 illustrates an embodiment of a stacked display 19 and associated supporting structure. On a top glass 11 is placed a polarizer 10. A spacer 15 is used to separate the top glass 11 from a center glass 12 allowing an opaqueable material 16 to be encased therein forming a first level. Preferably, the opaqueable material 16 is a conventional liquid crystal material. Similarly, a second level of like construction is created between the center glass 12 and a bottom glass 13 with an opaqueable material 17 encased therein. A polarizer 14 is placed on the bottom glass 12 to complete the stacked display 19.

In accordance with known techniques, electrodes, not shown, are patterned within each level prior to encasement so that voltage potentials may be selectively applied to segments of liquid crystal material within each level. The segments are defined by electrode patterns formed on the center glass 12 while other electrodes on the top glass 11 and bottom glass 13 may be common to a plurality of segments.

Note that each level is systematically reduced in width. Hence, the width at the first level associated with opaqueable material 17 is smaller than the level at the second level associated with the opaqueable material 16. This structure creates an inverted pyramid appearance so that as the stacked display is lowered in the direction indicated by arrows 18, the steps of the pyramid will form contacts to couple to conductive elastomers 21, 22, 23, and 24 providing ready contacts for electrical communication. The leads on each level, not shown, are exposed on the steps.

The height of the elastomers 21, 22, 23, and 24 are adjusted so that once the stacked display is placed in position, a space is left between the stacked display 19 and a printed circuit (PC) board 25. In this space an integrated circuit (IC) 20 is attached and electrically connected to the PC board 25 by bone wirer 26'.

Figure 2:
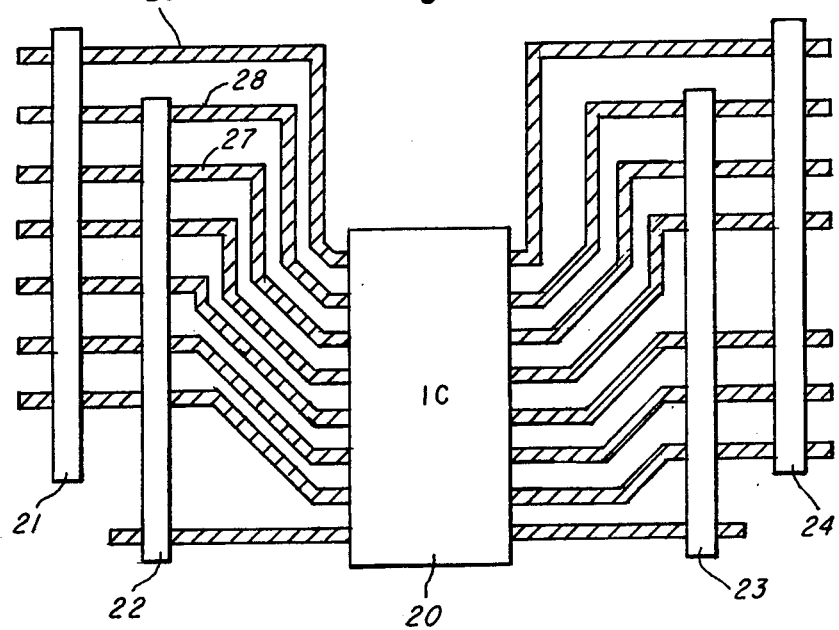
FIG. 2 is a schematic top view of an integrated circuit device and associated interconnects employed in the invention.

Referring to FIG. 2, each pin of IC 20 is connected to a lead such as 26, 27, or 29 which communicates with at least one of the elastomers 21, 22, 23 or 24. Four of the pins on the IC 20, specifically in this embodiment, the outer two pins on each side, are connected via one of the leads to a single elastomer. For example, lead 26 contacts only elastomer 21. The interior pins on the IC 20 are each connected to two elastomers.

Figure 3:
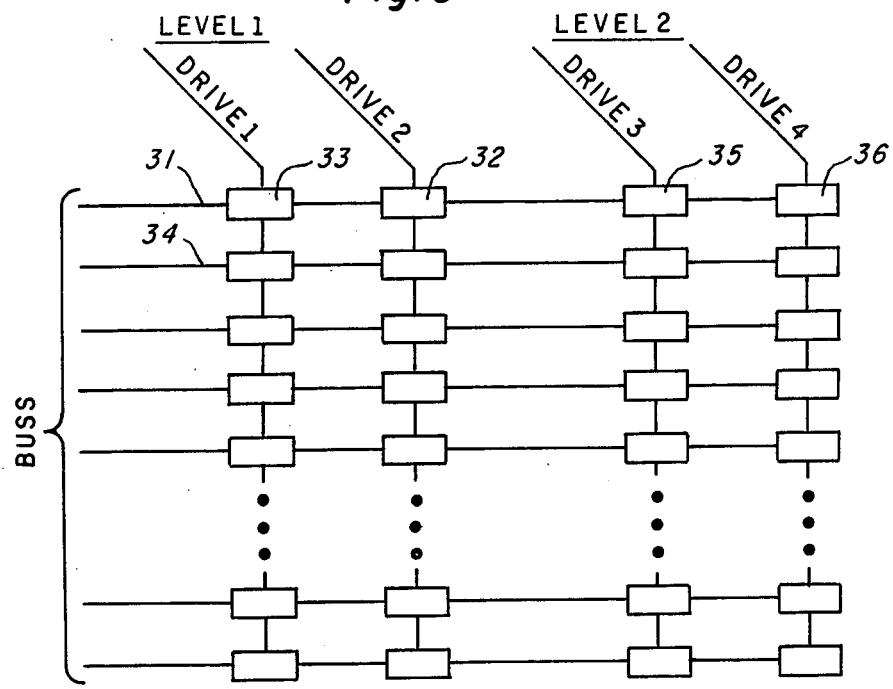
FIG. 3 is an interconnection schematic of bus lines and drive lines according to the invention.

Referring now to FIG. 3, the connections between the bus lines and the common will be described. Each of the bus lines, such as lines 31 and 34, communicates with two segments within each level which is divided into two sets of segments each. Each segment communicates with each drive line or common; each drive line communicates with, in this case, half of the segments within the level. Hence, the bus line 31 communicates with segment 33 and segment 32 within level 1 and with segments 35 and segment 36 within level 2. If drive line 3 and drive line 4 are both forced to a center tap (described below), only level 1 will be visible to the operator. Similarly, if drive line 1 and drive line 2 are driven to a center tap, then level 2 is visible to the operator, while level 1 remains transparent. By selectively choosing the wave form signal on bus line 31, and providing that drive line 1 and drive line 2 both are at non-centered tap values, either one, both or neither of segments 32 and 33 are activated.

Referring to FIG. 4a, various signals representing the square wave forms and wave forms are illustrated. Half-duty cycle multiplexing is employed. During time $t_1$, drive 1 is in a square wave form until time $t_2$ when it is driven to a center tap. Similarly drive 2 is also in square form during $t_1$. Conversely, drive 3 and drive 4 are in square wave form only during time $t_2$, whereas they are at center tap during time $t_1$. During time $t_1$ the level associated with drive 1 and drive 2 is visible to the operator; during time $t_2$, the level associated with drive 3 and drive 4 are visible. While, there are in this discussion, two levels, the number of levels is extendable to almost any number. The number of levels is practically limited by the number of levels which allows a contrast ratio sufficient for communication to the operator.

Various wave forms which may be communicated over the bus line, as described in FIG. 3, are illustrated by select A, select B, select C, and select D. Note that each of the selects, A, B, C, or D, are each 90° out of phase with the other ones, thereby providing the total range of possibilities through 360°. Those in the art recognize that other wave forms may be applied to achieve the results.

Figure 4B:
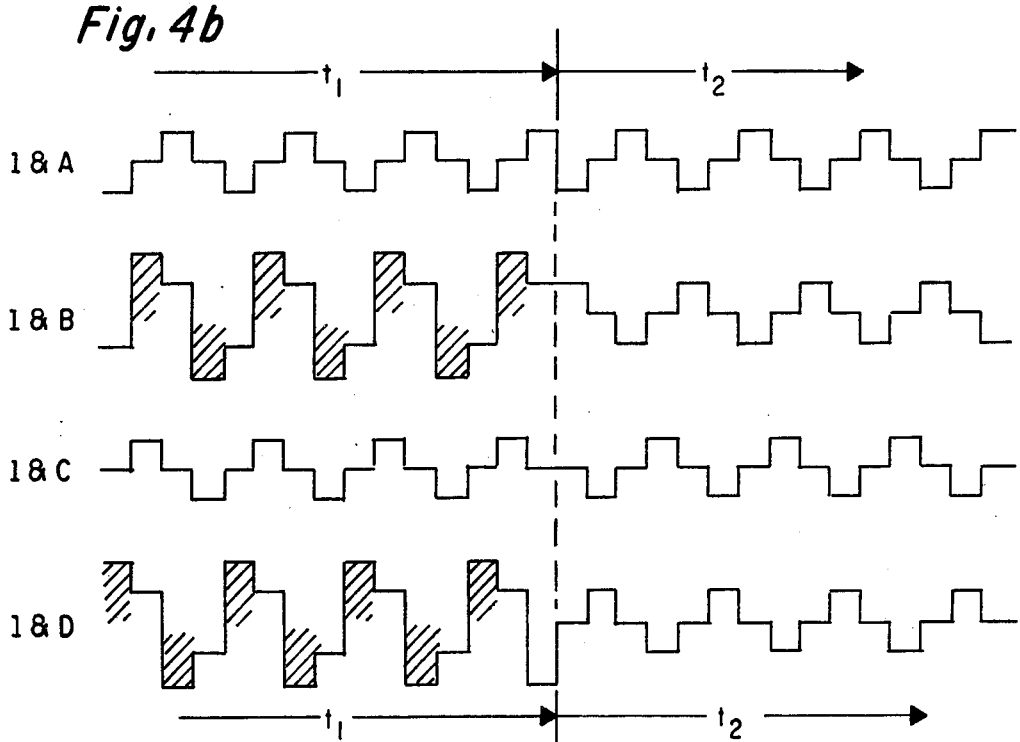
Figure 4C:
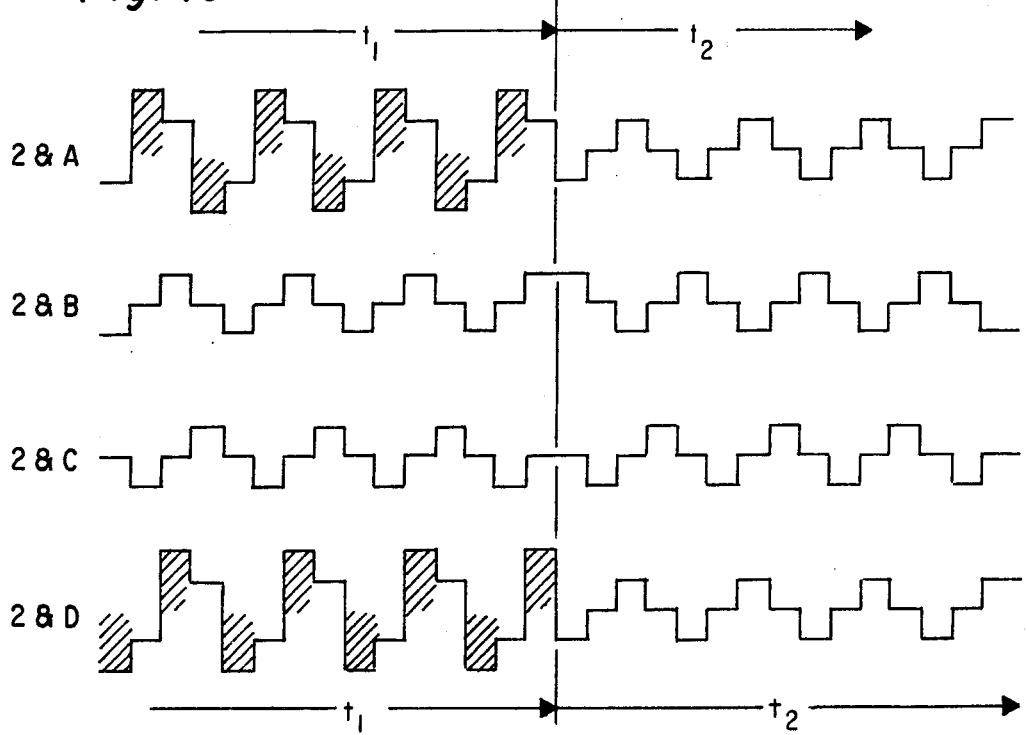

In FIGS. 4b, 4c; 4d and 4e, the diagrams illustrate the potential difference from the drive to the segment as indicated.

FIG. 4b charts the potential difference between drive 1 and the four various select modes A, B, C, and D during the two time frames of interest, $t_1$ and $t_2$. Drive 1, when combined with either select A or select C does not activate the segment; whereas, when combined with select B or select D during time $t_1$, the effected segment becomes activated as a result of the higher RMS potential generated as indicated by the hatch-marked areas.

In FIG. 4c, drive 2 is compared with the four select possibilities. In this situation, drive 2, when combined with select B or select C does not activate or cause the affected segment to become activated. Drive 2 with select A or select B causes the segment to become activated, as indicated by the hatch-mark areas. Note again, that this occurs only during time $t_1$, the time prior to drive 2 being forced to a center tap.

In comparing FIG. 4b with FIG. 4c, note that the total number of possibilities in selectively activating a segment are represented. Since each select line is connected to two segments, either one, both or neither of them is selectively activated. In the case where drive 1 and drive 2 both affect the same level and where a select line is connected to a segment in which drive 1 and drive 2 are supplying a drive force, where only one of the segments is to be activated, the signal carried by the bus is either that of select line A or select line B depending upon which drive line is affecting the segments to be activated; if both segments are to be activated, select D is the signal which is communicated; and if neither segment is to be activated, the signal to be communicated would be that shown in select line C. Hence, the control line, by appropriately maneuvering the signal communicated via the bus to either select A, select B, select C or select D, effectively activates any one of the segments within the level. Additionally note though, that regardless of which select signal is communicated, the drive lines, by forcing to a center tap, make the entire level clear. Thus, the drive lines effectively perform as an "on" and "off" while the bus drive makes it possible for the particular segment to be activated or not activated.

Figure 4D:
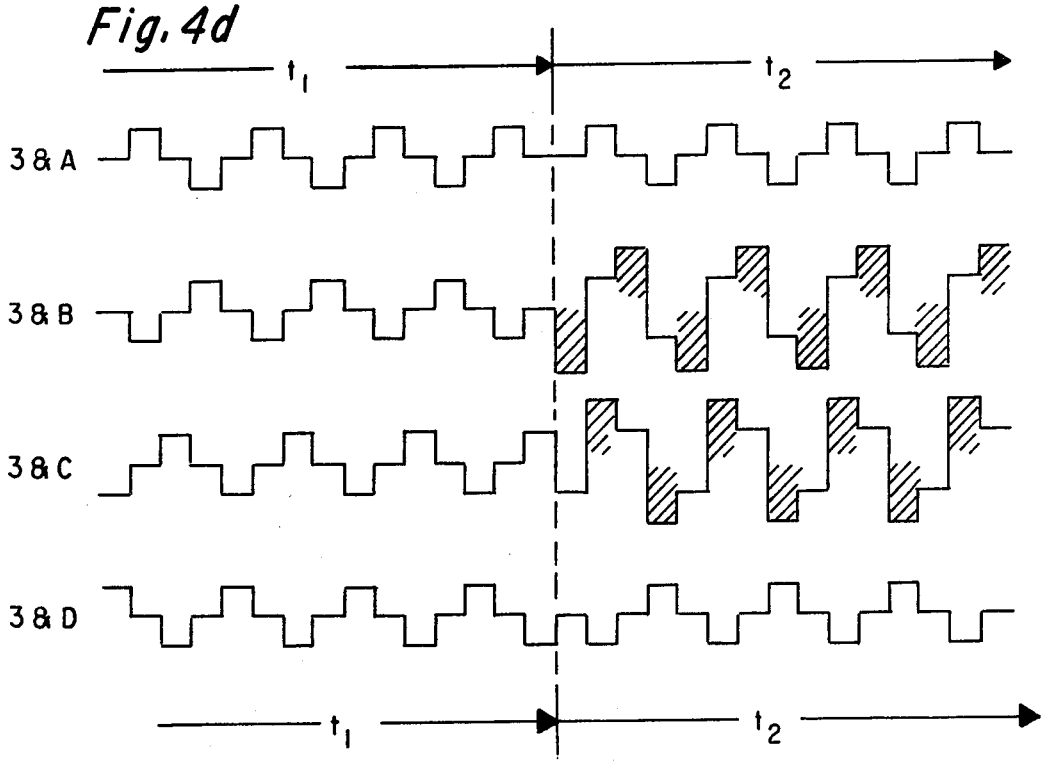
Figure 4E:
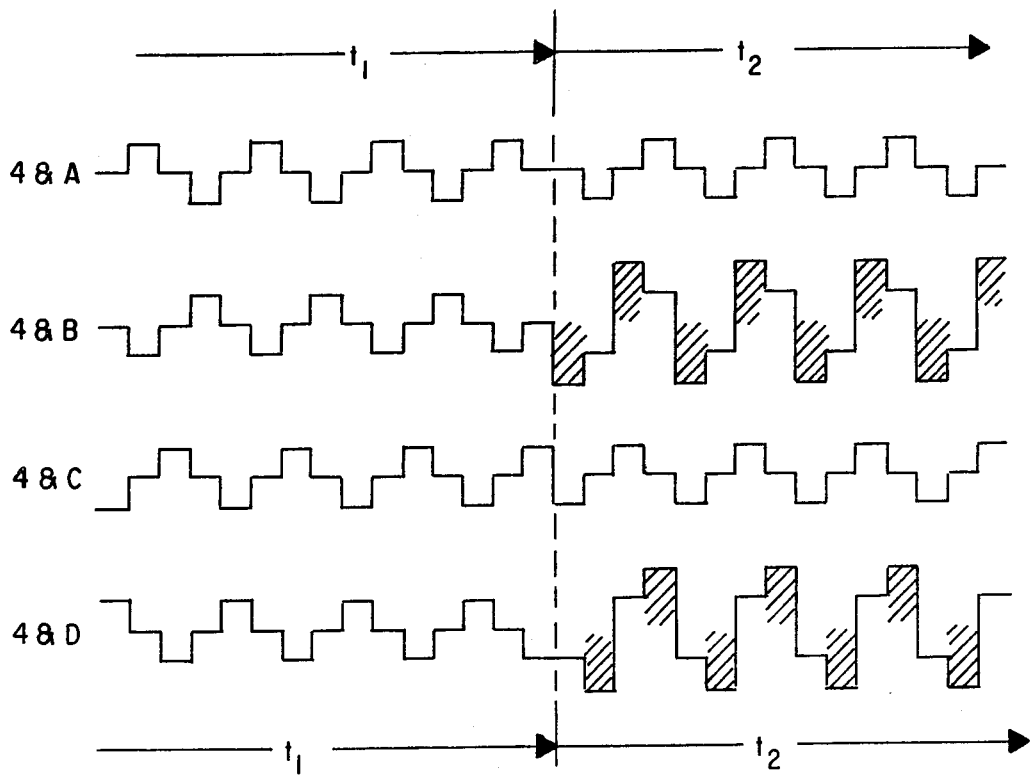

FIG. 4d and FIG. 4e are similar diagrams as those of FIGS. 4b, 4c. In FIGS. 4d and 4e, however, the drive lines used in the illustration are drive 3 and drive 4, respectively. Again, for each drive line the segment is activated whenever the drive is not at a center tap. Drive 3 and drive 4 allow the level to be viewed only during time $t_2$. During time $t_1$, when the drive lines are a center tap, regardless of the signal received by the segments, they will not become activated since the potential between the leads of the bus and the drive line does not reach the required threshold voltage.

Figure 5:
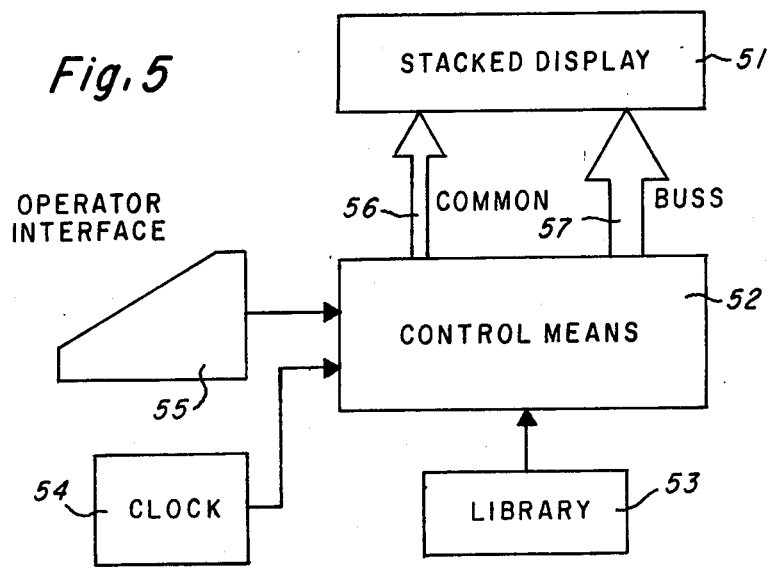
FIG. 5 is a block diagram of an operating system employed with the invention.

The flow of data and instructions is illustrated in FIG. 5. The control means 52 receives a clock pulse signal from the clock 54. As per the operation of the control means 52, the appropriate wave configuration is determined and found in the library 53 and communicated to the stacked display 51 by the control means 52 via the bus 57.

The control means 52 similarly supplies a square signal to the stacked display 51 via the common 56. As discussed earlier, the square signals are at a center tap where the level is to be transparent within the stacked display. Should a different level be desired to be viewed, the operator enters a command to the control means 52 via the operator interface 55. In this manner, the various levels of the stacked display 51 are selectively viewable by the operator.

Figure 6:
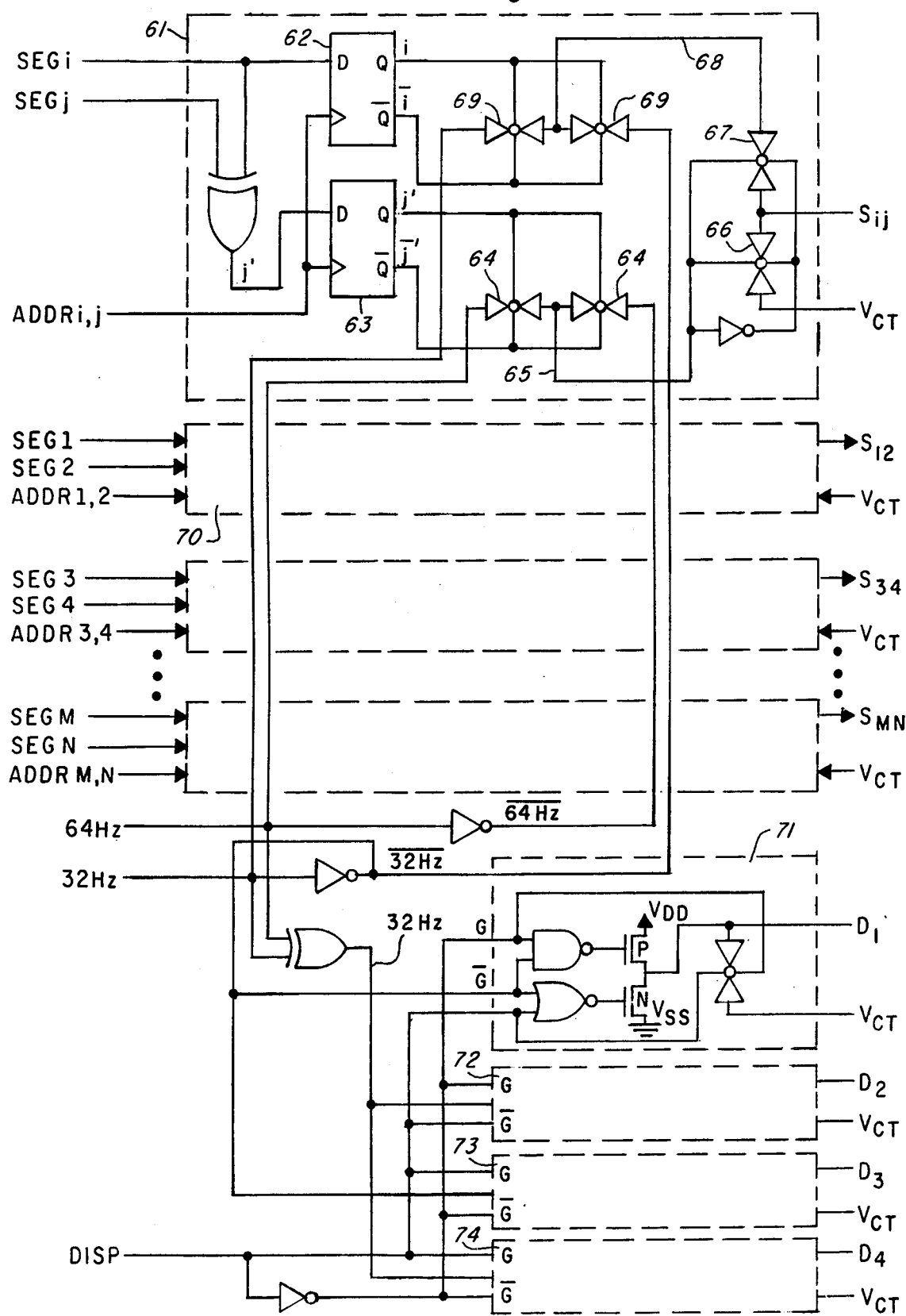

One embodiment which creates the waves and thus, the potentials described in FIGS. 4a–4e, is illustrated in FIG. 6. Each segment drive line, such as $S_{ij}$, controls two segments, (e.g. i and j). The segment line is controlled by the electronics illustrated by the logic of 61. The status of the segment associated with drive 1 or 3 (Seg i) is stored in a latch 62 and the exclusive-or result (j) of the segments associated with drive 2 or 4 (Seg j) with Seg i is stored in a latch 63. The j' result in turn selects either a 64 Hz or $\overline{64}$ Hz clock signal via the pair of transfer gates 64. This clock signal 65 in turn selects a center tap voltage $V_{CT}$ for the output Sij on each low level portion of the clock transfer gate 66. Otherwise, transfer gate 67 selects the clock signal from line 68 for the output Sij. Clock line 68 is established by the transfer gate pair 69 which selects either 32 Hz or $\overline{32 \text{ Hz}}$ depending on the status of the Segi latch 62.

The 64 hertz and a 32 hertz clocks also provide the appropriate timing for the drive lines 71, 72, 73 and 74. When it is desired to have a particular level turned "off", the center tap voltage $V_{CT}$ is established for that pair of drive lines as a result of the DISP input status. The logic of the drive line is illustrated in 71.

Figure 7:
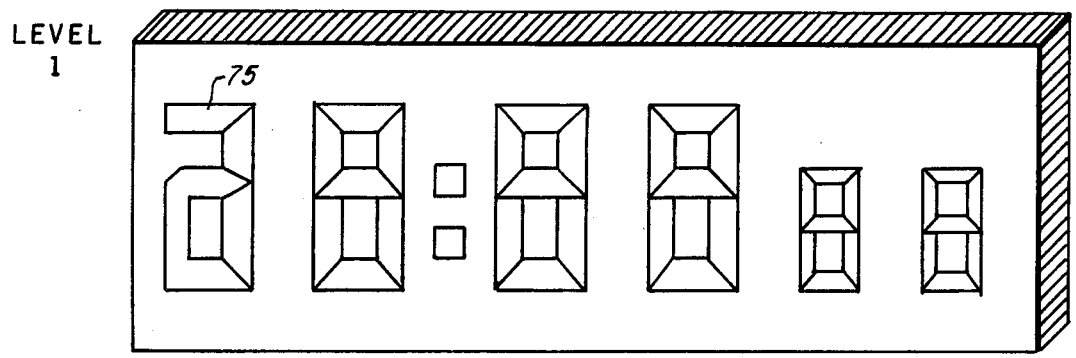
FIG. 7 pictorially illustrates an embodiment of a two-level stacked display according to the invention.
Figure 7:
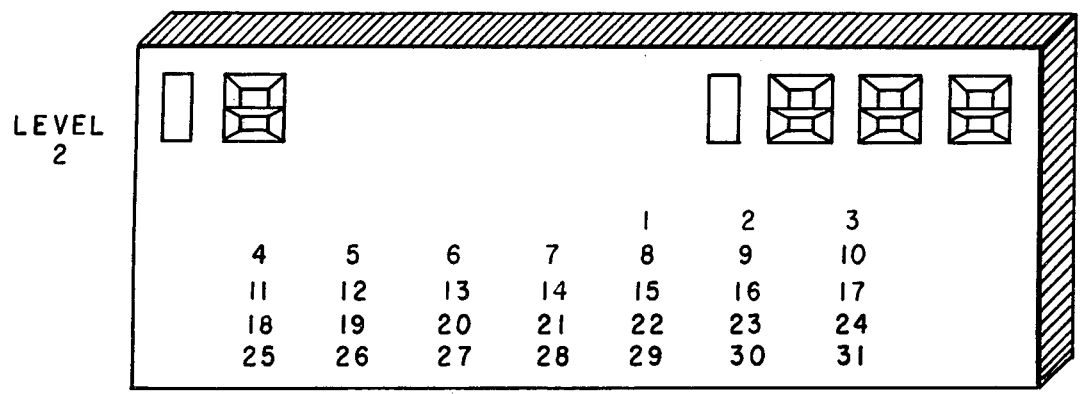

By way of example, FIG. 7 pictorially illustrates two levels of a stacked display. Level 1 has segments arranged to display time and level 2 has segments arranged to display calendar information. One of the segments is indicated by reference numeral 75.

During normal operation, level 1 is active or communicates to the operator while level 2 is transparent. Upon operator selection, level 1 becomes transparent and level 2 communicates its relevant data to the operator. Other arrangements of information are contemplated by the invention.

Those skilled in the art will appreciate that the present invention enables operation a multi-level display by means of an integrated circuit controller with a minimum of leads interconnecting the display and controller. Although a preferred embodiment has been described in detail, various modifications and alternative embodiments are within the spirit and scope of the invention as defined by the appended claims.

What is claimed is:

1. A stacked display comprising:
   an upper transparent member;
   a center transparent member disposed below and parallel to the upper transparent member;
   a first level of liquid crystal material disposed between the upper and center transparent members;
   a lower transparent member disposed below and parallel to the center transparent member;
   a second level of liquid crystal material disposed between the center and lower transparent members;
   sealing means disposed between the transparent members at the edges of each level for retaining the liquid crystal material within the respective levels;
   first and second sets of segment electrodes disposed in predetermined patterns on the top surface of the center transparent member;
   first conductive means disposed on the bottom surface of the upper transparent member in vertical juxtaposition with the first set of segment electrodes;
   second conductive means disposed on the bottom surface of the upper transparent member in vertical juxtaposition with the second set of segment electrodes;
   third and fourth sets of segment electrodes disposed in predetermined patterns on the bottom surface of the center transparent member;
   third conductive means disosed on the top surface of the lower transparent member in vertical juxtaposition with the third set of segment electrodes;
   fourth conductive means disposed on the top surface of the lower transparent member in vertical juxtaposition with the fourth set of segment electrodes;
   a plurality of bus lines, each bus line being connected to one segment electrode in each of the four sets;
   drive means connected to each of the four conductive means for selectively applying first or second signals to the respective conductive means, wherein the first signal enables the liquid crystal material disposed between the respective conductive means and the corresponding segment electrodes to be altered from a transparent state to an opaque state whenever selected segment electrodes are energized in response to an energizing signal applied to the respective bus lines, and wherein the second signal maintains the liquid crystal material disposed between the respective conductive means and the corresponding segment electrodes in a transparent state despite the application of the energizing signal to the respective bus lines.

2. The display of claim 1 further comprising:
   control means for selectively enabling one level of liquid crystal material and disabling the other by applying either the first signal to the first and second conductive means while applying the second signal to the third and fourth conductive means or by applying the first signal to the third and fourth conductive means while applying the second signal to the first and second conductive means, the control means applying the signals to the conductive means such that visual information may be displayed in only one level at a time.

3. The display of claim 2, wherein at least some of the segment electrodes on the top surface of the center transparent member are vertically disposed above the segment electrodes on the bottom surface of the center transparent member so that area of displayable information is shared by the two levels.

* * * * *